(12) United States Patent
Brinckmann et al.

(10) Patent No.: US 12,186,917 B2
(45) Date of Patent: Jan. 7, 2025

(54) METHOD AND APPARATUS FOR CALIBRATING OPHTHALMIC LENS GRIPPERS

(71) Applicant: ALCON INC., Fribourg (CH)

(72) Inventors: Felix Brinckmann, Rossdorf (DE); Nils Schweizer, Bad König (DE); Jens Wolfstaedter, Kleinwallstadt (DE)

(73) Assignee: Alcon Inc., Fribourg (CH)

( * ) Notice: Subject to any disclaimer, the term of this patent is extended or adjusted under 35 U.S.C. 154(b) by 940 days.

(21) Appl. No.: 17/229,006

(22) Filed: Apr. 13, 2021

(65) Prior Publication Data

US 2021/0323162 A1 Oct. 21, 2021

Related U.S. Application Data

(60) Provisional application No. 63/011,083, filed on Apr. 16, 2020.

(51) Int. Cl.
*B25J 9/16* (2006.01)
*B25J 15/06* (2006.01)
(Continued)

(52) U.S. Cl.
CPC ......... *B25J 9/1692* (2013.01); *B25J 15/0616* (2013.01); *B29D 11/00182* (2013.01); *B65G 47/91* (2013.01)

(58) Field of Classification Search
CPC ............... B25J 9/1692; B25J 15/0616; B29D 11/00182; B29D 11/00125; B29D 11/00951; B29D 11/0024; B65G 47/91; G01B 11/002; G01B 21/042; G05B 19/401
See application file for complete search history.

(56) References Cited

U.S. PATENT DOCUMENTS 6,438,448 B1 * 8/2002 Manes ................. G11B 17/225
700/214
9,254,616 B2 * 2/2016 Biel ..................... B29C 37/0007
(Continued)

FOREIGN PATENT DOCUMENTS

EP 0131743 B1 9/1991
EP 1136241 B1 6/2006
(Continued)

*Primary Examiner* — Stephen A Vu
(74) *Attorney, Agent, or Firm* — Sheng-Hsin Hu (57) ABSTRACT

A method for calibrating lens grippers prior to use of the grippers in a lens manufacturing line includes providing a remote gripper calibration tool having an assembly plate and a Z-directional position sensor; providing a master gripper having a length dimension terminating in a tip, the length dimension being predetermined to match a desired final extension length of a lens gripper; mounting the master gripper to the assembly plate; measuring the Z-directional position of the tip of the master gripper with the Z-directional position sensor; unmounting the master gripper from the assembly plate; mounting a lens gripper to be calibrated to the assembly plate, the lens gripper having a tip, and calibrating the lens gripper by adjusting the final extension length of the tip of the lens gripper to a predetermined position relative to the measured Z-directional position of the tip of the master gripper.

14 Claims, 7 Drawing Sheets

(51) Int. Cl.
*B29D 11/00* (2006.01)
*B65G 47/91* (2006.01)

(56) References Cited

U.S. PATENT DOCUMENTS

| | | | |
|---|---|---|---|
| 9,796,145 B2 * | 10/2017 | Biel | ................... B29D 11/0024 |
| 10,518,265 B2 | 12/2019 | Holmes et al. | |
| 2015/0138540 A1 | 5/2015 | Newman et al. | |
| 2016/0167322 A1 * | 6/2016 | Biel | ..................... B25J 15/0616 |
| | | | 414/785 |

FOREIGN PATENT DOCUMENTS

| | | |
|---|---|---|
| TW | 565686 B | 12/2003 |
| WO | 03016855 A1 | 2/2003 |
| WO | 2010020623 A1 | 2/2010 |
| WO | 2011026868 A1 | 3/2011 |
| WO | 2015036431 A1 | 3/2015 |

* cited by examiner

METHOD AND APPARATUS FOR CALIBRATING OPHTHALMIC LENS GRIPPERS

FIELD

The present invention relates to a method and apparatus for calibrating lens grippers used in the transport of ophthalmic lenses, such as contact lenses.

BACKGROUND

The calibration method and apparatus are particularly useful for enabling rapid replacement of lens grippers with minimal production line down time.

In the automated production of contact lenses in general, but especially in the production of large batches of contact lenses, as is the case for example with high-speed manufacturing lines for disposable contact lenses, the lenses are often transported from one position or station to another station in the manufacturing line by the use of lens grippers.

For example, grippers may be used to remove contact lenses from mold halves, to place into and remove contact lenses from inspection cuvettes and treatment containers, to re-invert contact lenses that are inverted, and to place contact lenses in their final destination in the primary packaging container (blister pack). Various grippers for contact lenses are known, by way of example, as from PCT publications WO2011/026868, WO2010/020623, and WO2015/036431, and generally are movable or have a movable member capable of moving downwardly (that is, vertically in the Z-direction) into whichever type of receptacle the contact lenses resides so as to engage the contact lens, and thereafter capable of moving back upwardly to remove the contact lens from that receptacle for placement of the contact lens into the next receptacle in the manufacturing line.

If for any reason a lens gripper should begin functioning poorly during contact lens manufacturing, the manufacturing line must be halted, the failed gripper unmounted from the manufacturing line, and a new gripper installed. During this time, of course, no contact lenses are being manufactured. Prior to use, the new gripper needs to be calibrated and adjusted if need be, to ensure it has proper function. This lens gripper calibration process expends additional time which translates to additional down time for the contact lens manufacturing line.

Therefore, there exists a need to reduce the time expended for changing out lens grippers in a contact lens manufacturing line while still ensuring the lens grippers are properly calibrated and in good working order. It is therefore an object of the present invention to overcome the afore-discussed disadvantages.

SUMMARY OF THE INVENTION

In accordance with the present invention, these and still further objects are met by the method and apparatus as are specified by the features of the independent claims. Further advantageous aspects of the method and the apparatus according to the invention are the subject of the dependent claims.

Throughout the entire specification including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the "about" is included and explicitly disclosed, unless the context clearly dictates otherwise. For example, if a range of "about" numerical value A to "about" numerical value B is disclosed, this is to be understood to include and explicitly disclose a range of numerical value A to numerical value B. Also, whenever features are combined with the term "or", the term "or" is to be understood to also include "and" unless it is evident from the specification that the term "or" must be understood as being exclusive.

According to the invention, a method for calibrating lens grippers for ophthalmic lenses, in particular contact lenses, prior to use of the lens grippers in a lens manufacturing line, is suggested. The method includes the steps of:

a) providing a remote gripper calibration tool including an assembly plate and a Z-directional position sensor;

b) providing a master gripper having a length dimension terminating in a tip, the length dimension being predetermined to match a desired final extension length of a lens gripper;

c) mounting the master gripper to the assembly plate;

d) measuring the Z-directional position of the tip of the master gripper with the Z-directional position sensor;

e) unmounting the master gripper from the assembly plate;

f) mounting a lens gripper to be calibrated to the assembly plate, the lens gripper having a tip, and calibrating the lens gripper by adjusting the final extension length of the tip of the lens gripper to a predetermined position relative to the measured Z-directional position of the tip of the master gripper.

According to an aspect of the method according to the invention, the predetermined position of the tip of the lens gripper is preferably within about 300 microns of the measured Z-directional position of the tip of the master gripper; that is to say, the predetermined position of the tip of the lens gripper may be about 300 microns higher or lower than the measured Z-directional position of the master gripper.

In other aspects of the method according to the invention, the remote gripper calibration tool may also include an X-directional position sensor and a Y-directional position sensor, and may in step d) of the method further include measuring the X- and Y-directional positions of the master gripper with the respective X- and Y-directional sensors, and may in step f) further include measuring the X- and Y-directional positions of the lens gripper with the respective X- and Y-directional position sensors to determine proper orientation and centration of the lens gripper. By way of particular example, the lens gripper may be properly centered if the measured X- and Y-directional positions of the lens gripper are independently within 300 microns (micrometers, μm) of the measured X- and Y-directional positions of the master gripper.

In accordance with a further aspect of the method according to the invention, the remote gripper calibration tool may include a vacuum connector and a pneumatic pressure connector, and in step f) may further include connecting the lens gripper to the vacuum connector and the pneumatic pressure connector to test proper vacuum and pressure function.

In accordance with yet a further aspect of the method according to the invention, the method further includes providing a lens receptacle carrier plate and mounting an adapter thereon, the adapter including a plurality of raised target studs having an upper surface, and in a lens manufacturing line having a lens receptacle transport system and a gripper mounting plate including a plurality of lens gripper mounting positions. The method further includes the steps of mounting the lens receptacle carrier plate onto the lens receptacle transport system, mounting the master gripper to the gripper mounting plate at least a first and second of the plurality of lens gripper mounting positions, measuring the distance between the tip of the master gripper and the upper surface of the raised target studs, and adjusting the Z-directional position of the tip of the master gripper by adjusting the gripper mounting plate to achieve a desired pre-determined distance between the upper surface of the raised target studs and the tip of the master gripper, at at least the first and second of the plurality of lens gripper mounting positions. In exemplary aspects, the desired predetermined distance between the upper surface of the raised target studs and the tip of the master gripper may be measured using a feeler gauge or a laser measurement device. In some further aspects, the desired predetermined distance between the upper surface of the raised target studs and the tip of the master gripper is from about 400 microns to about 1000 microns, and particularly about 700 microns.

According to a further aspect of the method according to the invention, the lens receptacle carrier plate may be configured for mounting lens inspection cuvettes thereon instead of the adapter including the raised target studs, each lens inspection cuvette having a cuvette bottom for an ophthalmic lens to rest on, and the method further includes mounting the lens inspection cuvettes to the receptacle carrier plate with the cuvette bottoms arranged at a level corresponding to a level of the upper surfaces of the raised target studs.

According to still a further aspect of the method according to the invention, the lens receptacle carrier plate may be configured to carry lens mold halves arranged thereon instead of the adapter including the raised target studs, each lens mold half including a surface to be gripped by the lens gripper, and wherein the method further includes arranging the lens mold halves on the lens receptacle carrier plate with the surfaces to be gripped arranged at a level corresponding to a level of the upper surfaces of the raised target studs.

In accordance with another aspect of the method according to the invention, the lens receptacle carrier plate may be configured to carry lens blister packages arranged thereon instead of the adapter including the raised target studs, each lens blister package including a surface to be gripped by the lens gripper, and wherein the method further includes arranging the lens blister packages with the surfaces to be gripped arranged at a level corresponding to a level of the upper surfaces of the raised target studs.

According to the invention, there is also suggested an apparatus for calibrating lens grippers for ophthalmic lenses, preferably contact lenses, prior to use of the lens grippers in a lens manufacturing line, the apparatus including:
 a remote gripper calibration tool having an assembly plate and a Z-directional position sensor configured to measure a predetermined range of Z-directional positions;
 a master gripper configured to be mounted to the assembly plate, the master gripper having a length dimension terminating in a tip, the length dimension being predetermined to match a desired final extension length of a lens gripper to be calibrated, wherein the Z-directional position sensor is arranged relative to the assembly plate at a location at which the tip of the master gripper mounted to the assembly plate is arranged at a Z-directional tip position within the predetermined range of Z-directional positions of the Z-directional position sensor, the Z-directional tip position being spaced by at least 300 microns from an upper end as well as from a lower end of the predetermined range of Z-directional positions.

In accordance with one aspect of the apparatus according to the invention, the remote gripper calibration tool may further include an X-directional position sensor and a Y-directional position sensor, the X-directional position sensor and the Y-directional position sensor being configured and arranged to measure the X-directional and Y-directional positions of the master gripper and of the lens gripper.

In accordance with yet a further aspect of the apparatus according to the invention, the gripper calibration tool may further include a vacuum connector and a pneumatic pressure connector configured and arranged to test proper vacuum and pressure function of a lens gripper to be calibrated.

The method and apparatus according to the invention have a plurality of advantages. One very important advantage is that a plurality of lens grippers can be calibrated off-line and remote from the manufacturing line at the remote gripper calibration tool, and can be stored in this calibrated state so as to be readily available at the time a lens gripper needs to be replaced in the manufacturing line. Replacement of the lens gripper in the manufacturing line can then be performed simply by unmounting the lens gripper to be replaced from the manufacturing line and by subsequently mounting a stored calibrated lens gripper to the manufacturing line. No calibration of the stored lens gripper needs to be performed on the manufacturing line anymore, thus greatly reducing the down time of the manufacturing line during gripper replacement. Advantageously, the calibrated lens gripper is not only calibrated with respect to the Z-directional position but also with respect to the X- and Y-directional positions, so that the calibrated lens gripper is centered, not inclined relative to the Z-direction, and is exactly calibrated as to the distance from the surface of the receptacle on which the ophthalmic lens rests and from which it is to be extracted.

Advantageously, it is also possible to test the calibrated lens gripper at the remote gripper calibration tool as regards the proper vacuum and pressure function of the lens gripper.

In addition, a particular station of a manufacturing line can be easily calibrated using the master gripper mounted to the gripper mounting plate of that station of the manufacturing line on one hand, and the lens receptacle carrier plate mounted to the (levelled) transport system of the manufacturing line carrying the adapter comprising the plurality of raised target studs having an upper surface on the other hand. Calibration of the station needs to be performed only once, and may be performed by adjusting the gripper mounting plate with the master gripper mounted to the gripper mounting plate at a first lens gripper mounting position. Adjustment is then performed such that the tip of the master gripper has a desired predetermined distance (in the range of, for example, 400 to 1000 microns. i.e. micrometers or 'μm', particularly about 700 microns) from the upper surface of the raised target stud. The position of this upper surface of the raised target stud corresponds to the position of the surface the ophthalmic lens rests on in the lens receptacle. Subsequently, the same adjustment is performed with the master gripper mounted to the gripper mounting plate at a second lens gripper mounting position. For example, these first and second lens gripper mounting positions can be the first and last gripper mounting positions of the plurality of gripper mounting positions of a gripper mounting plate, although this is not mandatory. The precise adjustment of the master gripper relative to the upper surface of the raised target stud may be reliably performed using a feeler gauge or any suitable optical measurement device, for example a laser measurement device.

While in particular such lens grippers may be used in a lens inspection station of a manufacturing line in which the ophthalmic lenses, e.g. contact lenses, are inspected in a liquid contained in an inspection cuvette and are subsequently removed from this inspection cuvette and placed into a primary packaging shell (e.g. the shell of a blister pack), they may generally be used in any station of a manufacturing line in which ophthalmic lenses are transferred from one receptacle to another receptacle.

In general, the invention provides for a very easy quick-change method and apparatus significantly reducing the overall down time of a manufacturing line in case a lens gripper needs to be replaced.

BRIEF DESCRIPTION OF THE DRAWINGS

Further advantageous aspects of the invention become apparent from the following description of aspects of the invention with the aid of the drawings, in which.

DETAILED DESCRIPTION

Figure 1:
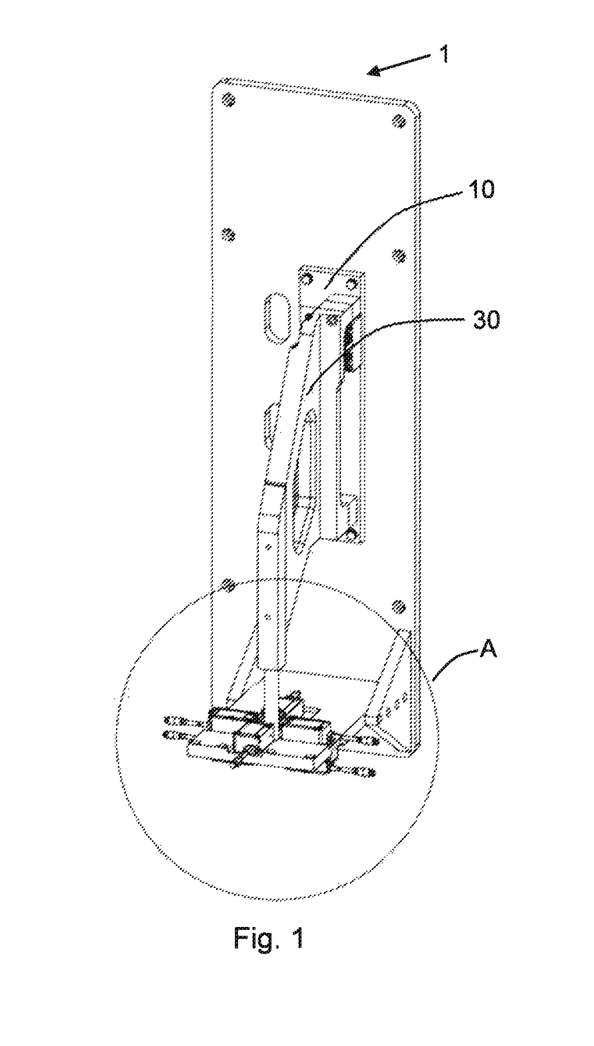
FIG. 1 illustrates an exemplary aspect of the general setup of the remote gripper calibration tool according to the present invention, including detail area A.
Figure 2:
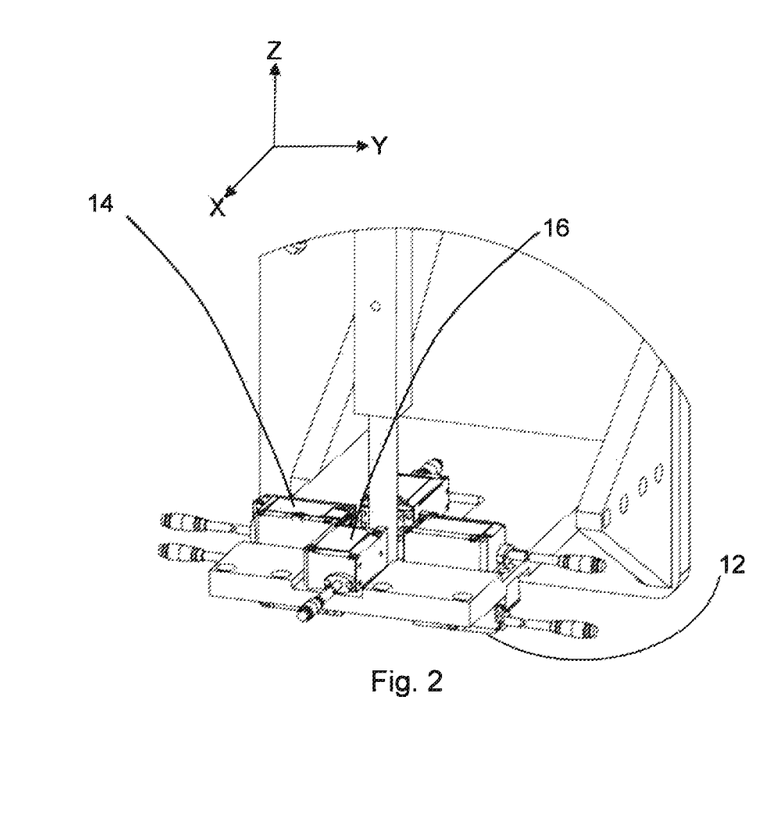
FIG. 2 illustrates the detail area A of FIG. 1.
Figure 3:
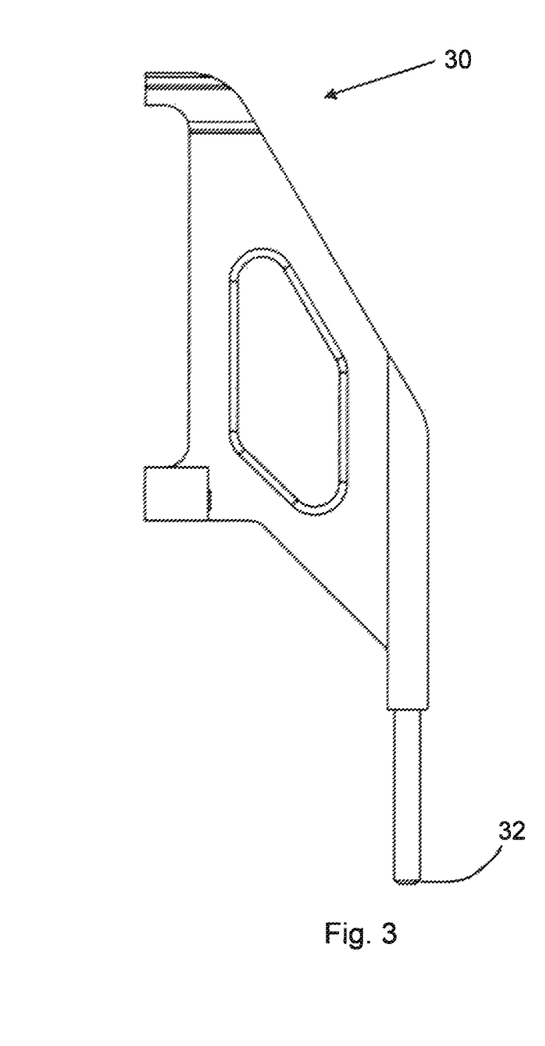
FIG. 3 illustrates a side view of the master gripper.
Figure 4:
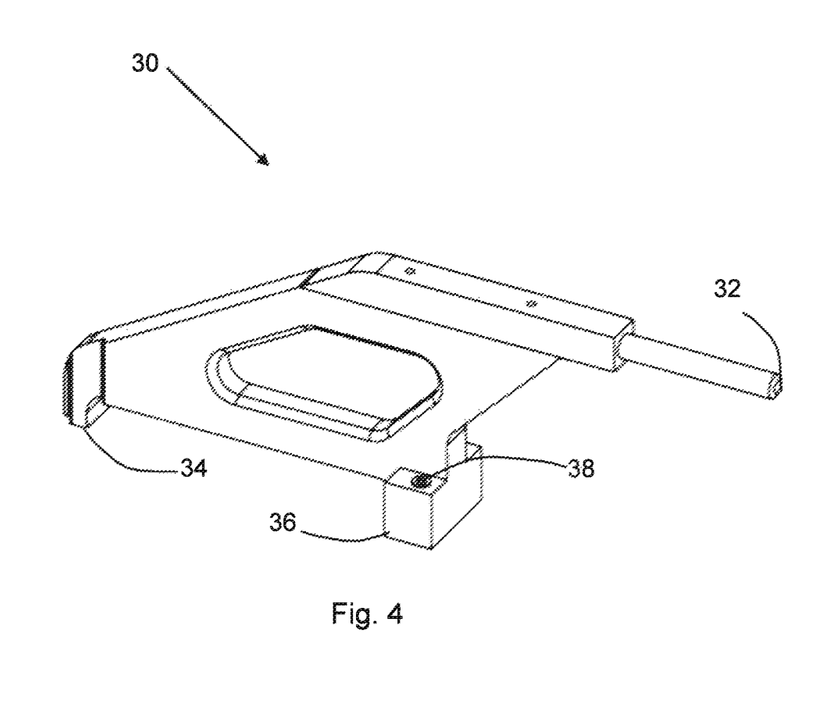
FIG. 4 illustrates a perspective view of the master gripper.

FIG. 1 illustrates the remote gripper calibration tool 1 which includes an assembly plate 10 to which a master gripper 30 is mounted (the master gripper 30 is shown in more detail in FIGS. 3-4). By "remote" it is meant that the calibration tool is not part of a lens manufacturing line but is instead located separately so that the calibration of the lens gripper may take place without disruption to the manufacturing process and prior to the time the lens gripper is required for use. The remote gripper calibration tool 1 also includes at least a Z-directional position sensor 12 (see detail A as shown in FIG. 2). The Z-directional position sensor 12 is desirably a non-contact sensor and may be, for example, a laser detection system capable of determining position based on the amount of light occluded, which is fixedly mounted to the remote gripper calibration tool 1.

In some aspects, the remote gripper calibration tool 1 may also desirably include an X-directional position sensor 14 and a Y-directional position sensor 16 as shown in FIG. 2, which like Z-directional position sensor 12 may be non-contact sensors such as the mentioned laser detection system. For the sake of clarity, FIG. 2 also includes a positional diagram illustrating the Z-direction (up/down, i.e., vertical), Y-direction (left-right horizontal as the figure is viewed) and X-direction (into and out of the diagram as the figure is viewed).

In use with the master gripper 30, to calibrate a lens gripper, first the master gripper 30 is mounted to the assembly plate 10 of the remote gripper calibration tool 1 and the Z-directional position sensor 12 is used to determine the Z-directional (vertical) position of the tip of the master gripper 30. FIGS. 3-4 illustrate the master gripper 30 in more detail, including the tip 32 of the master gripper. The master gripper 30 has a length extension terminating in the tip 32 so as to match a predetermined desired final extension length of a lens gripper which is to be calibrated. The master gripper 30 also has mounting portions 34, 36 which lie flush against the assembly plate 10 when the master gripper 30 is mounted thereto, and contain fastening elements 38 which may be for example a bolt or captive screw (additional fastening elements of mounting portions 34, 36 are not shown). The mounting portions and fastening elements of the master gripper 30 as well as centering bolts (not shown) projecting from the surface of the mounting portions 34, 36 towards the assembly plate 10 and fitting into corresponding centering holes in the assembly plate 10 are configured to match those of an actual lens gripper (to make sure the master gripper 30 and the lens grippers to be calibrated are reproducibly mounted to the assembly plate).

Returning to FIGS. 1-2, the master gripper 30 is shown mounted to the assembly plate 10, with the tip 32 of the master gripper 30 extending into the portion of the remote gripper calibration tool 1 including the Z-directional position sensor 12 to measure the Z-directional position of the tip 32 of the master gripper 30. As mentioned, X- and Y-directional position sensors 14 and 16 may also be provided and if so, are used to measure or determine the X- and Y-position of the tip 32 of the master gripper 30. After the desired position information regarding the tip 32 of the master gripper 30 has been collected (at least Z-directional position and possibly also X- and Y-directional position information), the master gripper 30 is unmounted from the remote gripper calibration tool 1.

Figure 5:
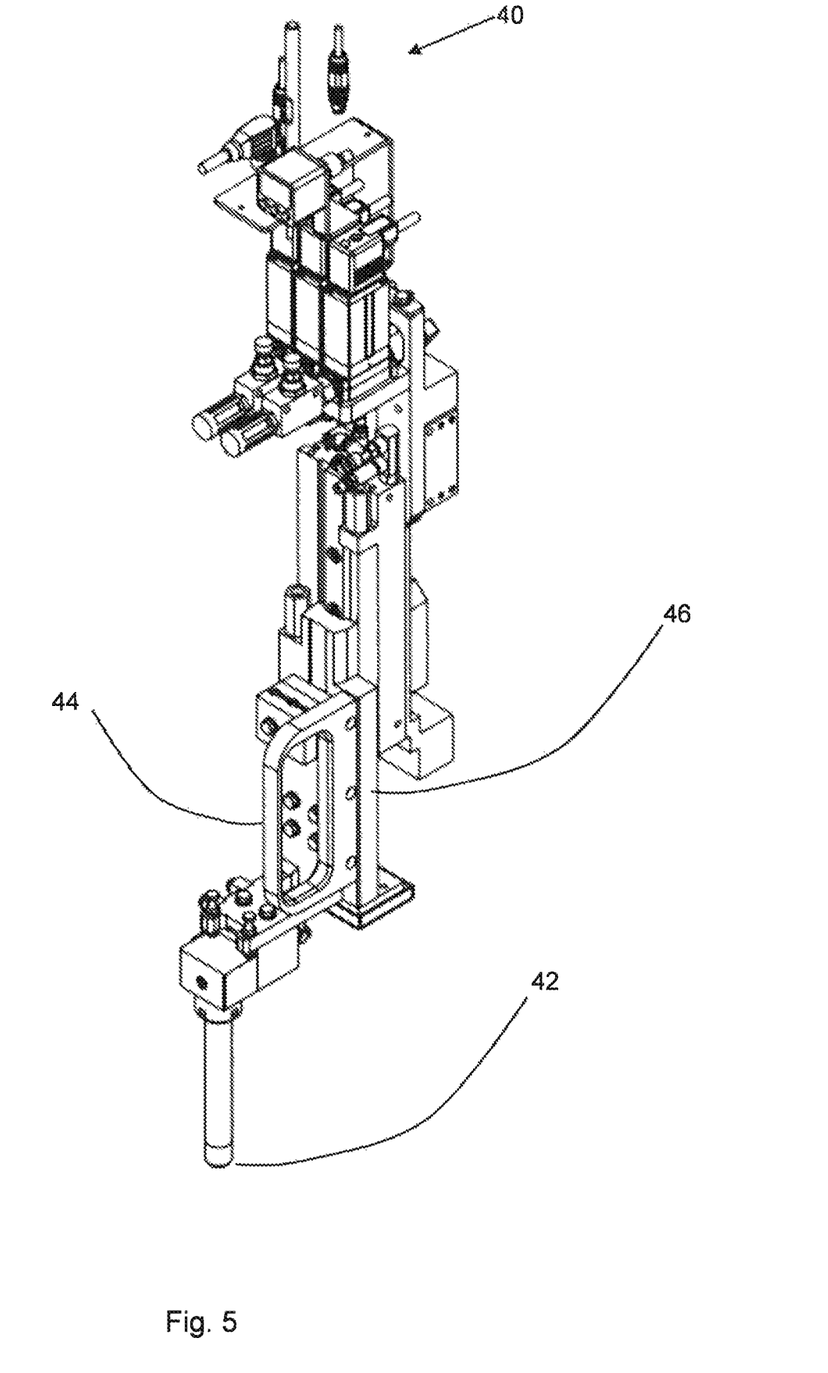
FIG. 5 illustrates a perspective view of a lens gripper.

A lens gripper 40 is shown in FIG. 5. As shown, the lens gripper 40 has a tip 42 which engages and picks up a contact lens from a receptacle. Lens gripper 40 also includes a handle 44 for assistance in managing the mass of the lens gripper 40 during mounting and unmounting operations. As shown in FIG. 5, the lens gripper 40 is set with its tip 42 in the lowermost position or its final extension length. In operation, the tip 42 of the lens gripper 40 is raised and lowered along the pneumatic cylinder 46 to remove a contact lens from its receptacle; that is, in its lowermost position the tip 42 of the lens gripper 40 inserts into a receptacle to collect the lens then is raised along the pneumatic cylinder 46 to extract the lens from the receptacle.

Figure 6:
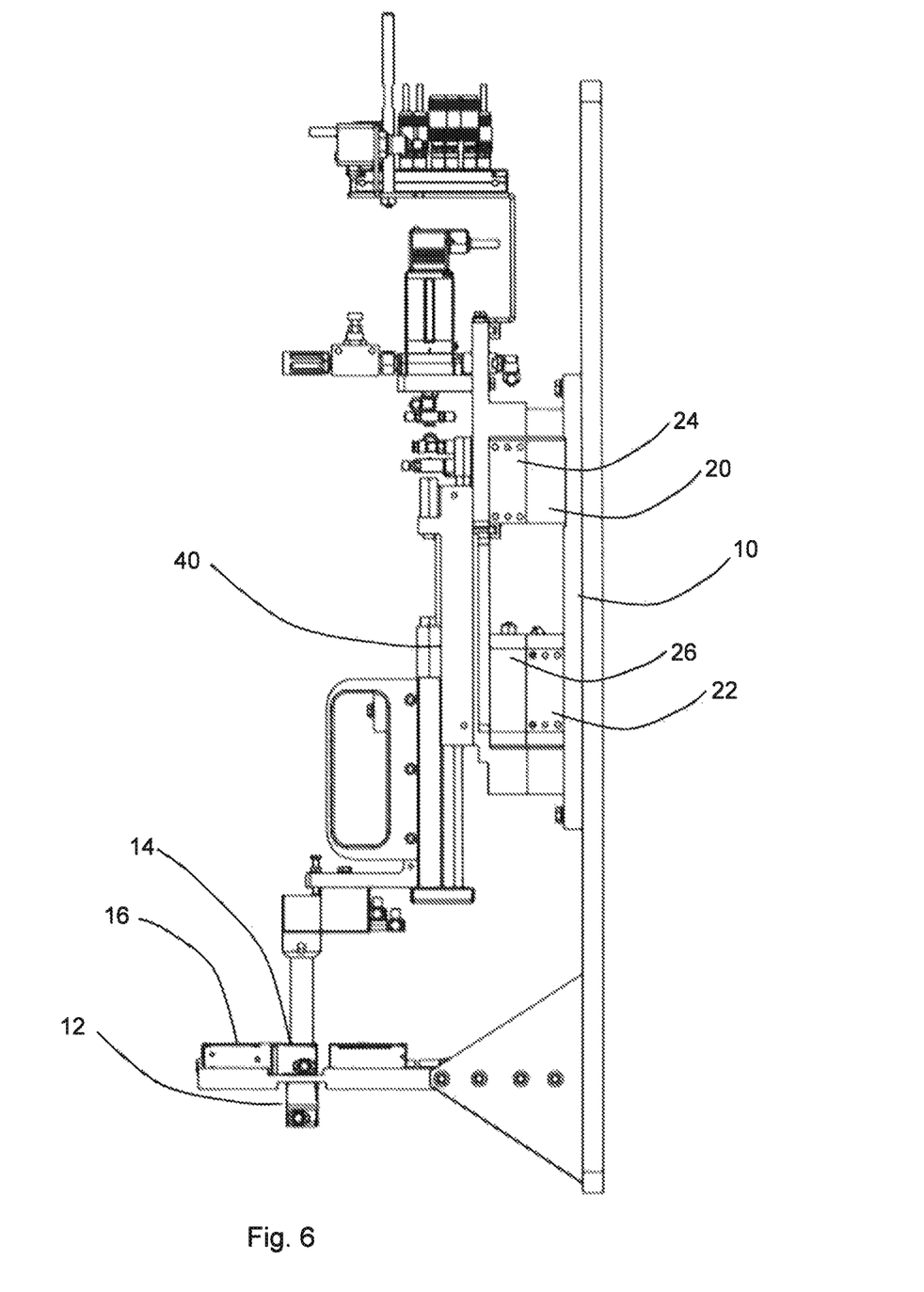
FIG. 6 illustrates a side view of a lens gripper mounted to the remote gripper calibration tool.

As shown in FIG. 6, after the tip 32 position(s) of the master gripper 30 have been determined and the master gripper 30 is unmounted, the lens gripper 40 to be calibrated is mounted to the assembly plate 10 of the remote gripper calibration tool 1. While not shown in FIG. 6, as mentioned above the master gripper 30 and the lens gripper 40 generally have the same type of mounting portions and fastening elements, to achieve the same fit to assembly plate 10. Using the Z-directional position information obtained when the master gripper 30 was mounted onto the remote gripper calibration tool 1, it can be determined using the Z-directional position sensor 12 whether the tip 42 of the lens gripper 40 matches the predetermined desired final extension length, which as mentioned above was determined using the master gripper 30, or is within an acceptable distance of the determined Z-directional position of the tip 32 of the master gripper 30. Generally speaking, the tip 42 of the lens gripper 40 should be within about 300 microns (plus or minus) of the determined Z-directional position of the tip 32 of the master gripper 30. If the tip 42 of the lens gripper 40 is not within an acceptable Z-directional distance, the final extension length of the tip 42 of the lens gripper 40 is adjusted to match the predetermined final extension length or to be within the acceptable distance.

In other aspects, if the X-directional position sensor 14 and a Y-directional position sensor 16 are provided, it can be determined whether the tip 42 of the lens gripper 40 matches (or is within an acceptable distance of) the X- and Y-position information collected when the master gripper 30 was mounted to the assembly plate 10 of the remote gripper calibration tool 1. If the tip 42 does not match the X- and/or Y-position information collected using the master gripper 30, e.g. tip 42 is not centered or is tilted at an angle from vertical, this could indicate that the lens gripper 40 is not fully mounted to the assembly plate 10 or in need of additional adjustment, or that it had been improperly manufactured, and that another lens gripper need be selected. Once a given gripper has undergone the calibration process, it can be stored away until it is needed to rapidly replace another lens gripper on the lens manufacturing line.

In addition, as shown in FIG. 6, in still other aspects the remote gripper calibration tool 1 may be provided with additional features, such as a vacuum connector 20 and a pneumatic pressure connector 22 which may be connected to the lens gripper 40 via the respective vacuum coupling 24 and pneumatic pressure coupling 26 of the lens gripper 40, and used to test for proper vacuum and pressure function of the lens gripper 40. Moreover, the remote gripper calibration tool 1 may be provided with one or more electrical connectors (not shown) which may be connected to corresponding electrical connectors of the lens gripper 40 to test proper function of the electrical connectors for operating the control valves of the lens gripper 40 enabling the supply of vacuum or pressure.

Figure 7:
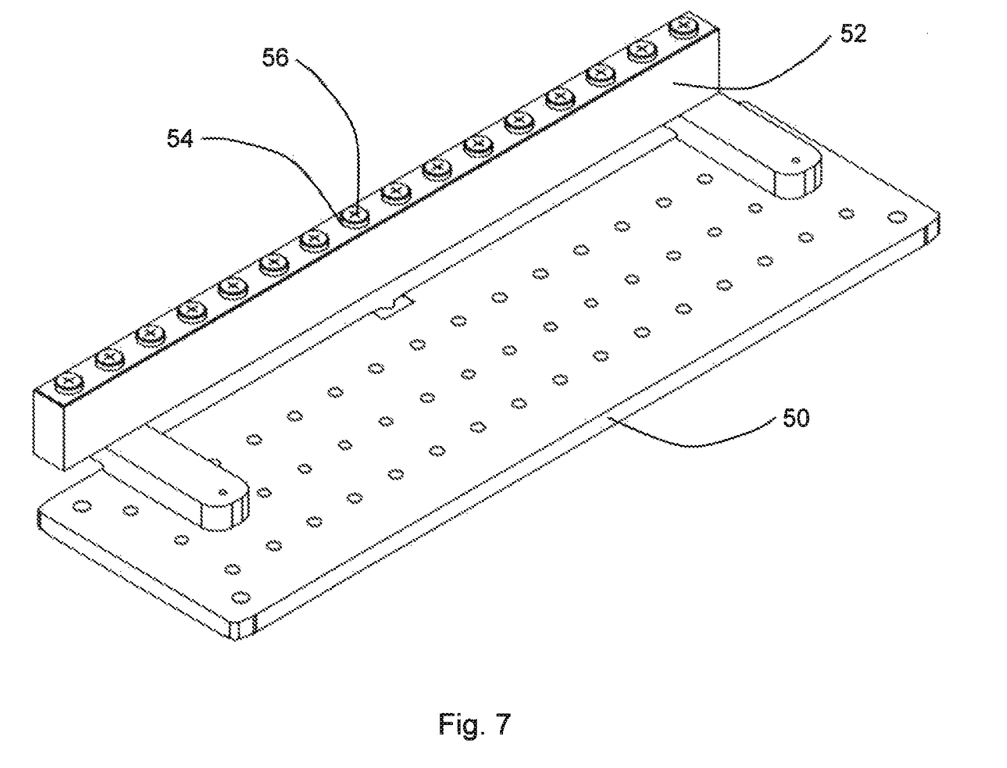
FIG. 7 illustrates a perspective view of a lens receptacle carrier plate with mounted adapter.
Figure 8:
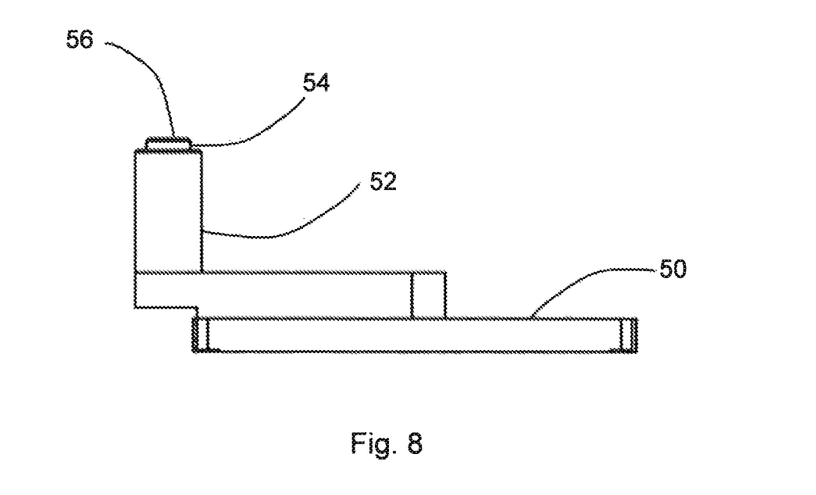
FIG. 8 illustrates the carrier plate of FIG. 7 in edge view.

FIGS. 7-11 illustrate still a further aspect of the invention. FIGS. 7-8 show a lens receptacle carrier plate 50 in perspective and edge-view, respectively. The lens receptacle carrier plate 50 is part of a lens receptacle transport system and may be a plate for carrying various types of lens-containing receptacles during contact lens manufacturing. For example, the lens receptacle carrier plate 50 may be configured to and used to carry lens inspection cuvettes, lens mold halves, lens blister packages, or other receptacles used to hold contact lenses at various points in a manufacturing line. For use in calibrating lens grippers, no lens receptacles are placed on the lens receptacle carrier plate 50 and instead an adapter 52 is mounted thereon. The adapter 52 includes a plurality of raised target studs 54 with an upper surface 56, as shown in FIGS. 7-8.

In this further aspect of the invention, the master gripper 30 is utilized temporarily on the actual lens manufacturing line. It should be noted that in the practice of this further aspect of the invention, it does not matter whether the master gripper 30 is first mounted to the assembly plate 10 of the remote gripper calibration tool 1 to have the positioning of the tip 32 of the master gripper 30 determined, or whether the master gripper 30 is first utilized in this further aspect on the lens manufacturing line. In use, the master gripper 30 is mounted to a gripper mounting plate on the lens manufacturing line. Generally such a gripper mounting plate includes a plurality of positions for lens grippers, for example seven, eight, ten, twelve, fourteen, sixteen, eighteen, twenty or more. The master gripper 30 is mounted to a first position on the gripper mounting plate and in the practice of this further aspect of the invention, the lens receptacle carrier plate 50 including the adapter 52 is transported in the manufacturing line below the master gripper 30.

Figure 9:
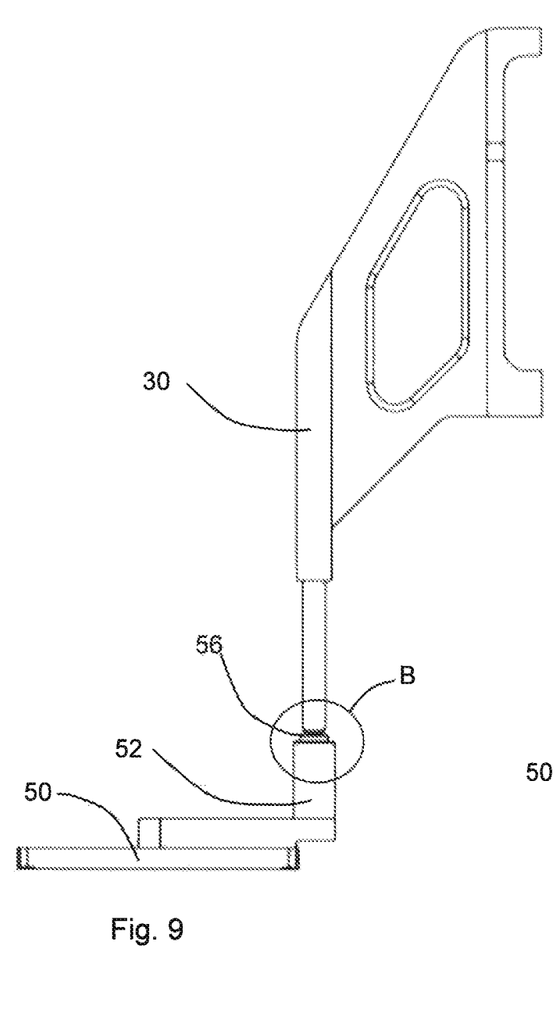
FIG. 9 illustrates the master gripper in use with the lens receptacle carrier plate shown in FIGS. 7-8, including detail area B.
Figure 11:
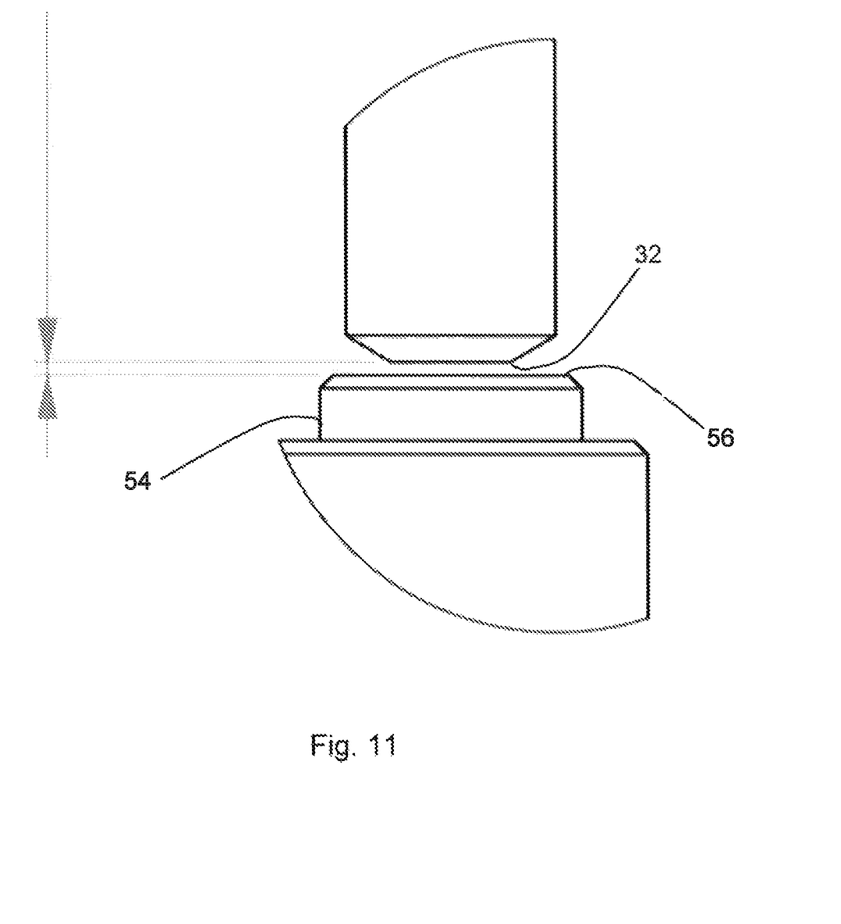
FIG. 11 illustrates the detail area B of FIG. 9.

This is shown in FIG. 9 with the master gripper 30 positioned above the lens receptacle carrier plate 50 and in particular the tip 32 of the master gripper 30 is position directly above the upper surface 56 of one of the target studs 54. Turning to detail B of FIG. 9 as shown in FIG. 11, it can be seen that a small gap or distance exists between the tip 32 of the master gripper 30 and the upper surface 56 of the target stud 54 (the gap as indicated by the converging arrows), such that the tip 32 of the master gripper 30 does not contact the upper surface 56 of the target stud 54. This distance corresponds to a desired predetermined distance and is configured to be small enough to permit a lens gripper to acquire the contact lens from a receptacle, but not so small that the tip 42 of the lens gripper presses the lens against the bottom of the receptacle, which could cause damage to the contact lens.

Generally speaking, a suitable gap or distance between the tip 32 of the master gripper 30 and the upper surface 56 of the target stud 54 may be between about 400 microns and about 1000 microns, and may particularly be about 700 microns. The distance may be measured and set using known tools such as finely machined metal feeler or gapping gauge, or by use of laser measurement devices or other optical measurement devices such as are known to those of skill in the art.

Once the measurement of the distance between the tip 32 of the master gripper 30 and the upper surface 56 of the target stud 54 has been taken, if the distance is not as desired, the gripper mounting plate may be adjusted upwards or downwards to correct the distance. Then, the master gripper 30 is mounted to at least one, second position on the gripper mounting plate (or a second essentially identical master gripper 30 is used) and the process of measuring the gap or distance, and adjusting the gripper mounting plate if necessary, is repeated to ensure that the distance is the same across the gripper mounting plate as between the tip 32 of the master gripper 30 and the upper surface 56 of the target stud 54 for each position so tested. Normally the positions for mounting the master gripper 30 to the gripper mounting plate will be the first and last of the plurality of positions, but this is not required as long as sufficient distance exists between positions to ensure reliable result.

Figure 10:
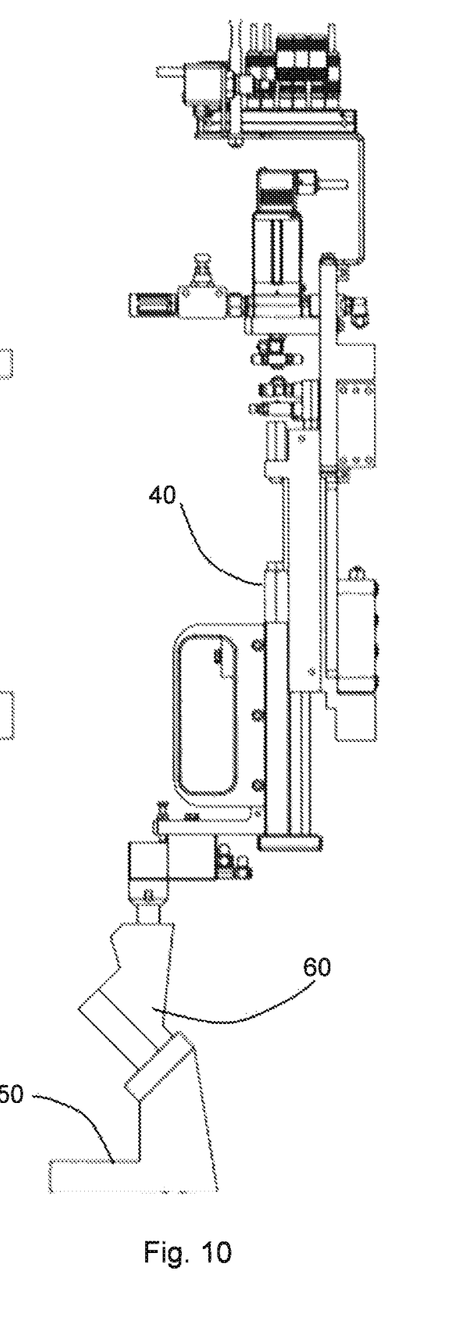
FIG. 10 illustrates the lens receptacle carrier plate as it would be used in a manufacturing line.

FIG. 10 shows the lens gripper 40 mounted on the gripper mounting plate and the lens receptacle carrier plate 50 holding lens inspection cuvette 60. As shown in FIG. 10, the tip of the lens gripper 40 is not visible because it is inserted inside the lens inspection cuvette 60 in order to grip the contact lenses (not shown). FIGS. 9-10 are on the same level and it can be seen that in the case of the lens receptacle carrier plate 50 carrying the lens inspection cuvettes 60, the cuvettes are configured and mounted such that the cuvette bottoms are arranged to be at a level that corresponds to the level of the upper surfaces 56 of the target studs 54 when the adapter plate 52 was mounted to the lens receptacle carrier plate 50.

Various other aspects are of course possible. If the lens receptacle carrier plate 50 is configured to carry mold halves as mentioned above, then each of the mold halves has a surface holding a contact lens to be gripped by a lens gripper, and so the mold halves are arranged on the lens receptacle carrier plate 50 with the surface arranged to be at a level that corresponds to the level of the upper surfaces 56 of the target studs 54 when the adapter plate 52 was mounted to the lens receptacle carrier plate 50. Similarly, if the lens receptacle carrier plate 50 is configured to carry lens blister packages as also mentioned above, then each of the blister packages has a surface holding a contact lens to be gripped by a lens gripper (or a surface upon which a contact lens is to be deposited by a lens gripper), and so the blister packages are arranged on the lens receptacle carrier plate 50 with such surface arranged to be at a level that corresponds to the level of the upper surfaces 56 of the target studs 54 when the adapter plate 52 was mounted to the lens receptacle carrier plate 50.

While various aspects of the invention have been described with the aid of the drawings, various modifications and alternatives are conceivable without departing from the teaching underlying the invention. Therefore, the invention is not intended to be limited to the various aspects described herein, but rather is defined by the scope of the appended claims.

The invention claimed is:

1. A method for calibrating lens grippers (40) for contact lenses, prior to use of the lens grippers (40) in a lens manufacturing line, the method comprising the steps of:
   a) providing a remote gripper calibration tool (1) comprising an assembly plate (10) and a Z-directional position sensor (12);
   b) providing a master gripper (30) having a length dimension terminating in a tip (32), the length dimension being predetermined to match a desired final extension length of a lens gripper (40);
   c) mounting the master gripper (30) to the assembly plate (10);
   d) measuring the Z-directional position of the tip (32) of the master gripper (30) with the Z-directional position sensor (12);
   e) unmounting the master gripper (30) from the assembly plate (10);
   f) mounting a lens gripper (40) to be calibrated to the assembly plate (10), the lens gripper having a tip (42), and calibrating the lens gripper (40) by adjusting the final extension length of the tip (42) of the lens gripper (40) to a predetermined position relative to the measured Z-directional position of the tip (32) of the master gripper (30).

2. The method according to claim 1, wherein the predetermined position of the tip (42) of the lens gripper (40) is within 300 microns of the measured Z-directional position of the tip (32) of the master gripper (30).

3. The method according to claim 1, the remote gripper calibration tool (1) further comprising an X-directional position sensor (14) and a Y-directional position sensor (16), wherein step d) further comprises measuring the X- and Y-directional positions of the master gripper (30) with the respective X- and Y-directional position sensors (14, 16), and wherein step f) further comprises measuring the X- and Y-directional positions of the lens gripper (40) with the respective X- and Y-directional position sensors (14, 16) to determine proper orientation and centration of the lens gripper (40).

4. The method according to claim 3, wherein the lens gripper (40) is properly centered if the measured X- and Y-directional positions of the lens gripper (40) are independently within 300 microns of the measured X- and Y-directional positions of the master gripper (30).

5. The method according to claim 1, wherein the remote gripper calibration tool (1) further comprises a vacuum connector (20) and a pneumatic pressure connector (22), and wherein step f) further comprises connecting the lens gripper (40) to the vacuum connector (20) and the pneumatic pressure connector (22) to test proper vacuum and pressure function.

6. The method according to claim 1, further comprising providing a lens receptacle carrier plate (50) and mounting an adapter (52) thereon, the adapter (52) comprising a plurality of raised target studs (54) having an upper surface (56), and in a lens manufacturing line having a lens receptacle transport system and a gripper mounting plate comprising a plurality of lens gripper (40) mounting positions, further comprising the steps of mounting the lens receptacle carrier plate (50) onto the lens receptacle transport system, mounting the master gripper (30) to the gripper mounting plate at at least a first and second of the plurality of lens gripper (40) mounting positions, measuring the distance between the tip (32) of the master gripper (30) and the upper surface (56) of the raised target studs (54), and adjusting the Z-directional position of the tip (32) of the master gripper (30) by adjusting the gripper mounting plate to achieve a desired predetermined distance between the upper surface (56) of the raised target studs (54) and the tip (32) of the master gripper (30) at at least the first and second of the plurality of lens gripper (40) mounting positions.

7. The method according to claim 6, wherein the desired predetermined distance between the upper surface (56) of the raised target studs (54) and the tip (32) of the master gripper (30) is measured using a feeler gauge or a laser measurement device.

8. The method according to claim 6, wherein the desired pre-determined distance between the upper surface (56) of the raised target studs (54) and the tip (32) of the master gripper (30) is from about 400 microns to about 1000 microns, and particularly about 700 microns.

9. The method according to claim 6, wherein the lens receptacle carrier plate (50) is configured for mounting lens inspection cuvettes (60) thereon instead of the adapter (52) comprising the raised target studs (54), each lens inspection cuvette having a cuvette bottom for an ophthalmic lens to rest on, and wherein the method further comprises mounting the lens inspection cuvettes (60) to the receptacle carrier plate (50) with the cuvette bottoms arranged at a level corresponding to a level of the upper surfaces (56) of the raised target studs (54).

10. The method according to claim 6, wherein the lens receptacle carrier plate (50) is configured to carry lens mold halves arranged thereon instead of the adapter (52) comprising the raised target studs (54), each lens mold half comprising a surface to be gripped by the lens gripper, and wherein the method further comprises arranging the lens mold halves on the lens receptacle carrier plate (5) with the surfaces to be gripped arranged at a level corresponding to a level of the upper surfaces (56) of the raised target studs (54).

11. The method according to claim 6, wherein the lens receptacle carrier plate (50) is configured to carry lens blister packages arranged thereon instead of the adapter (52) comprising the raised target studs (54), each lens blister package comprising a surface to be gripped by the lens gripper, and wherein the method further comprises arranging the lens blister packages with the surfaces to be gripped arranged at a level corresponding to a level of the upper surfaces (56) of the raised target studs (54).

12. An apparatus for calibrating lens grippers (40) for contact lenses, prior to use of the lens grippers (40) in a lens manufacturing line, the apparatus comprising a remote gripper calibration tool (1) comprising an assembly plate (10) and a Z-directional position sensor (12) configured to measure a predetermined range of Z-directional positions, and further comprising a master gripper (30) configured to be mounted to the assembly plate (10), the master gripper (30) having a length dimension terminating in a tip (32), the length dimension being predetermined to match a desired final extension length of a lens gripper (40) to be calibrated, wherein the Z-directional position sensor (12) is arranged relative to the assembly plate (10) at a location at which the tip (32) of the master gripper (30) mounted to the assembly plate (10) is arranged at a Z-directional tip position within the predetermined range of Z-directional positions of the Z-directional position sensor, the Z-directional tip position being spaced by at least 300 microns from an upper end as well as from a lower end of the predetermined range of Z-directional positions.

13. The apparatus according to claim 12, the remote gripper calibration tool further comprising an X-directional position sensor (14) and a Y-directional position sensor (16), the X-directional position sensor (14) and the Y-directional position sensor (16) being configured and arranged to measure the X-directional and Y-directional positions of the master gripper and of the lens gripper.

14. The apparatus according to claim 12, the remote gripper calibration tool (1) further comprising a vacuum connector (20) and a pneumatic pressure connector (22) configured and arranged to test proper vacuum and pressure function of a lens gripper (40) to be calibrated.

\* \* \* \* \*